(12) United States Patent
Ross

(10) Patent No.: US 9,806,587 B2
(45) Date of Patent: Oct. 31, 2017

(54) SYSTEM AND METHOD FOR STATOR CONSTRUCTION OF AN ELECTRIC MOTOR

(71) Applicant: Robert Ross, Harlingen, TX (US)

(72) Inventor: Robert Ross, Harlingen, TX (US)

( * ) Notice: Subject to any disclaimer, the term of this patent is extended or adjusted under 35 U.S.C. 154(b) by 536 days.

(21) Appl. No.: 14/466,919

(22) Filed: Aug. 22, 2014

(65) Prior Publication Data

US 2015/0052737 A1    Feb. 26, 2015

Related U.S. Application Data

(60) Provisional application No. 61/870,152, filed on Aug. 26, 2013.

(51) Int. Cl.
| | | |
|---|---|---|
| *H02K 15/02* | (2006.01) | |
| *H02K 15/10* | (2006.01) | |
| *H02K 15/12* | (2006.01) | |

(52) U.S. Cl.
CPC ............ *H02K 15/02* (2013.01); *H02K 15/12* (2013.01); *Y10T 29/49012* (2015.01)

(58) Field of Classification Search
CPC .. H02K 15/12; H02K 15/02; Y10T 29/49012; Y10T 29/49073; Y10T 29/49075; Y10T 29/49078
USPC ........ 29/596, 598, 602.1, 607, 609; 310/166
See application file for complete search history.

(56) References Cited

U.S. PATENT DOCUMENTS

| | | |
|---|---|---|
| 1,275,201 A | 8/1918 | Beach |
| 3,477,537 A | 11/1969 | Plishner |
| 3,792,327 A | 2/1974 | Waldorf |
| 3,866,703 A | 2/1975 | Eastham |
| 3,986,370 A | 10/1976 | Garrison et al. |
| 4,012,680 A | 3/1977 | Dickerson et al. |
| 4,209,723 A | 6/1980 | Hamman |
| 4,233,532 A | 11/1980 | Esters |
| 4,263,524 A | 4/1981 | Diederichs |
| 4,306,156 A | 12/1981 | Monaco et al. |
| 4,318,449 A | 3/1982 | Salisbury |
| 4,335,337 A | 6/1982 | Okamatsu et al. |
| 4,339,015 A | 7/1982 | Fowkes et al. |
| 4,350,911 A | 9/1982 | Wilson et al. |
| 4,361,788 A | 11/1982 | Melocik |

(Continued)

FOREIGN PATENT DOCUMENTS

| | | |
|---|---|---|
| CA | 560086 A | 7/1958 |
| EP | 0 004 194 A1 | 9/1979 |

(Continued)

*Primary Examiner* — Donghai D Nguyen

(74) *Attorney, Agent, or Firm* — Jefferson IP Law LLP

(57) ABSTRACT

A system and method to reduce core loss in the stator of an electric motor by first preparing laminations of the stator and/or rotor in a water jetting operation, punching or stamping operation, laser cutting operation, or similar manufacturing operation, and then subjecting the laminations to a temperature treatment in a manner such that, upon assembly into a stator and/or rotor of an electric motor and operated within expected parameters, core loss is reduced. The system and method subjects the laminations to a cold bath preferably consisting of liquid nitrogen, after stamping but preferably prior to assembly, and then stacking the laminations together for assembly as a stator and/or rotor of an electric motor.

17 Claims, 2 Drawing Sheets

(56) References Cited

U.S. PATENT DOCUMENTS

| | | |
|---|---|---|
| 4,444,120 A | 4/1984 | Bille |
| 4,470,476 A | 9/1984 | Hunt |
| 4,535,263 A | 8/1985 | Avery |
| 4,577,129 A | 3/1986 | Bertram |
| 4,578,608 A | 3/1986 | Mech et al. |
| 4,951,769 A | 8/1990 | Kawamura |
| 5,019,755 A | 5/1991 | Walker |
| 5,057,726 A | 10/1991 | Mole et al. |
| 5,161,634 A | 11/1992 | Ichihara et al. |
| 5,166,584 A | 11/1992 | Fukino et al. |
| 5,194,773 A | 3/1993 | Clarke |
| 5,212,431 A | 5/1993 | Origuchi et al. |
| 5,289,890 A | 3/1994 | Toyoda et al. |
| 5,291,960 A | 3/1994 | Brandenburg et al. |
| 5,359,228 A | 10/1994 | Yoshida |
| 5,365,137 A | 11/1994 | Richardson et al. |
| 5,384,520 A | 1/1995 | Yang |
| 5,402,046 A | 3/1995 | Jeanneret |
| 5,441,122 A | 8/1995 | Yoshida |
| 5,453,930 A | 9/1995 | Imaseki et al. |
| 5,460,234 A | 10/1995 | Matsuura et al. |
| 5,471,384 A | 11/1995 | Nakashima et al. |
| 5,492,190 A | 2/1996 | Yoshida |
| 5,509,491 A | 4/1996 | Hall |
| 5,525,851 A | 6/1996 | Kumamoto et al. |
| 5,549,172 A | 8/1996 | Mutoh et al. |
| 5,649,349 A * | 7/1997 | Greenway ............ H01F 41/0233 29/598 |
| 5,677,582 A | 10/1997 | Lutz et al. |
| 5,729,066 A | 3/1998 | Soong et al. |
| 5,734,238 A | 3/1998 | Yanagisawa et al. |
| 5,744,895 A | 4/1998 | Seguchi et al. |
| 5,751,086 A | 5/1998 | Taghezout |
| 5,785,138 A | 7/1998 | Yoshida |
| 5,804,935 A | 9/1998 | Radev |
| 5,823,281 A | 10/1998 | Yamaguchi et al. |
| 5,846,155 A | 12/1998 | Taniguchi et al. |
| 5,848,659 A | 12/1998 | Karg et al. |
| 5,894,182 A | 4/1999 | Saban et al. |
| 5,904,631 A | 5/1999 | Morisawa et al. |
| 5,982,074 A | 11/1999 | Smith et al. |
| 5,990,590 A | 11/1999 | Roesel, Jr. et al. |
| 6,005,358 A | 12/1999 | Radev |
| 6,019,183 A | 2/2000 | Shimasaki et al. |
| 6,034,456 A | 3/2000 | Osama et al. |
| 6,065,565 A | 5/2000 | Puszkiewicz et al. |
| 6,098,733 A | 8/2000 | Ibaraki et al. |
| 6,153,959 A | 11/2000 | Lorenzo |
| 6,166,469 A | 12/2000 | Osama et al. |
| 6,209,672 B1 | 4/2001 | Severinsky |
| 6,232,743 B1 | 5/2001 | Nakanishi |
| 6,242,884 B1 | 6/2001 | Lipo et al. |
| 6,278,211 B1 | 8/2001 | Sweo |
| 6,281,612 B1 * | 8/2001 | Asao ........................ H02K 3/12 29/596 |
| 6,288,508 B1 | 9/2001 | Taketomi et al. |
| 6,344,008 B1 | 2/2002 | Nagano et al. |
| 6,429,562 B2 | 8/2002 | Nakano |
| 6,472,845 B2 | 10/2002 | Minagawa et al. |
| 6,531,799 B1 | 3/2003 | Miller |
| 6,538,400 B2 | 3/2003 | Fowler et al. |
| 6,559,569 B2 | 5/2003 | Aoshima |
| 6,612,963 B2 | 9/2003 | Minowa et al. |
| 6,655,483 B2 | 12/2003 | Hayashi |
| 6,661,160 B2 | 12/2003 | Kim |
| 6,700,266 B2 | 3/2004 | Winkel et al. |
| 6,707,205 B2 | 3/2004 | Johnsen |
| 6,708,789 B1 | 3/2004 | Albuquerque De Souza E Silva |
| 6,809,453 B2 | 10/2004 | Narita et al. |
| 6,819,017 B2 | 11/2004 | Winkel et al. |
| 6,844,643 B2 | 1/2005 | Aoshima |
| 6,873,071 B2 | 3/2005 | Dooley |
| 6,886,647 B1 | 5/2005 | Gotta |
| 6,909,215 B2 | 6/2005 | Bryant |
| 6,935,449 B2 | 8/2005 | Chernoff et al. |
| 7,004,273 B1 | 2/2006 | Gruenwald et al. |
| 7,034,500 B2 | 4/2006 | Ionel |
| 7,100,719 B2 | 9/2006 | Yamaguchi |
| 7,104,347 B2 | 9/2006 | Severinsky et al. |
| 7,117,963 B2 | 10/2006 | Saito et al. |
| 7,180,259 B2 | 2/2007 | Matsumoto et al. |
| 7,190,133 B2 | 3/2007 | King et al. |
| 7,224,132 B2 | 5/2007 | Cho et al. |
| 7,230,363 B2 | 6/2007 | Stout et al. |
| 7,240,751 B2 | 7/2007 | Hoare et al. |
| 7,256,524 B2 | 8/2007 | Minagawa |
| 7,308,958 B2 | 12/2007 | Tamor et al. |
| 7,317,295 B2 | 1/2008 | Izumi et al. |
| 7,345,390 B2 | 3/2008 | Schuler et al. |
| 7,365,504 B2 | 4/2008 | Kroeger |
| 7,397,156 B2 | 7/2008 | Mukai et al. |
| 7,397,159 B2 | 7/2008 | Yoshinaga |
| 7,400,077 B2 | 7/2008 | Caroon |
| 7,455,134 B2 | 11/2008 | Severinsky et al. |
| 7,458,203 B2 | 12/2008 | Pott |
| 7,466,053 B1 | 12/2008 | Radev |
| 7,497,285 B1 | 3/2009 | Radev |
| 7,520,353 B2 | 4/2009 | Severinsky et al. |
| 8,550,196 B2 | 10/2013 | Ross |
| 2004/0061396 A1 | 4/2004 | Narita et al. |
| 2007/0040383 A1 | 2/2007 | Mehl et al. |
| 2007/0278883 A1 * | 12/2007 | Marcenaro ......... B22D 19/0054 29/598 |
| 2009/0127971 A1 | 5/2009 | Ishizeki et al. |
| 2012/0186888 A1 | 7/2012 | Ross |

FOREIGN PATENT DOCUMENTS

| | | |
|---|---|---|
| EP | 0 438 442 B1 | 7/1991 |
| EP | 0 577 980 A1 | 1/1994 |
| EP | 0 780 961 A1 | 6/1997 |
| GB | 831967 | 4/1960 |
| GB | 831967 A | 4/1960 |
| TW | M344268 | 11/2008 |
| WO | WO 2007/118082 A2 | 10/2007 |
| WO | WO 2011/025918 A1 | 3/2011 |

* cited by examiner

| Back Iron Flux | 1st Core Untreated | 1st Core Treated | 2nd Core Untreated | 2nd Core Treated |
|---|---|---|---|---|
| *85,000* | | | | |
| Amps | 196 | 59 | 171 | 60 |
| Watts | 243 | 131 | 246 | 138 |
| Flux | 677.854 | 677.854 | 677.854 | 677.854 |
| Watts loss/lbs | 2.747 | 1.481 | 2.781 | 1.56 |
| *90,000* | | | | |
| Amps | 235 | 61 | 204 | 65 |
| Watts | 269 | 136 | 276 | 156 |
| Flux | 717.728 | 717.728 | 717.728 | 717.728 |
| Watts loss/lbs | 3.041 | 1.537 | 3.12 | 1.763 |
| *95,000* | | | | |
| Amps | 292 | 68 | 224 | 68 |
| Watts | 297 | 165 | 292 | 168 |
| Flux | 757.602 | 757.602 | 757.602 | 757.602 |
| Watts loss/lbs | 3.358 | 1.865 | 3.301 | 1.899 |
| *100,000* | | | | |
| Amps | 362 | 67 | 278 | 71 |
| Watts | 325 | 151 | 323 | 180 |
| Flux | 797.475 | 797.475 | 797.475 | 797.475 |
| Watts loss/lbs | 3.674 | 1.707 | 3.652 | 2.035 |
| *125,000* | | | | |
| Amps | 1408 | 98 | 735 | blank |
| Watts | 526 | 268 | 471 | blank |
| Flux | 996.85 | 996.85 | 996.85 | blank |
| Watts loss/lbs | 5.947 | 3.03 | 5.325 | blank |

*FIG. 3*

SYSTEM AND METHOD FOR STATOR CONSTRUCTION OF AN ELECTRIC MOTOR

CROSS-REFERENCE TO RELATED APPLICATIONS

The present application claims the benefit under 35 U.S.C. 119(e) of a U.S. provisional patent application entitled "System and Method for Stator Construction of an Electric Motor", Ser. No. 61/870,152, filed Aug. 26, 2013, the entire content of said application being incorporated herein by reference.

FIELD OF THE INVENTION

The present invention relates to a system and method to reduce core loss in the stator and/or rotor of an electric motor. Laminations of the stator and/or rotor are prepared in one or more of a water jetting operation, punching or stamping operation, laser cutting operation, or similar manufacturing operation, and are then subjected to a temperature treatment in a manner such that, upon assembly into a stator and/or rotor of an electric motor and operated within expected parameters, core loss is reduced.

DESCRIPTION OF THE RELATED ART

A conventional electric motor includes a rotor and stator, wherein the rotor is rigidly joined to a shaft thereby allowing communication of an output power from the motor. The stator is affixed to the case so that no relative motion between the stator and the case can occur. The rotor and stator are surrounded by a housing case and an end bell completes the enclosure of the motor and includes any configuration of bearings required by the application to provide rotational support to the shaft.

The stator typically consists of a stator frame, a slotted stator core and a three-phase winding imbedded in the slots. The rotor is cylindrical and constructed with one or more of a distributed winding or salient poles with a coil wound on each leg. The stator and rotor are constructed of steel laminations arranged and assembled using a stacking pressure to produce a desired magnetic permeability.

However, in every such construction, the electric motor suffers a number of energy losses during operation. For example, a core loss comprising both hysteresis and eddy current loss occurs in a typical electric motor as a function of applied operational induction and frequency values. Such a core loss is defined as the amount of energy expended per unit mass of core material at a specific operating induction and frequency value. The hysteresis loss element of the core loss is the result of material resistance to domain arrangement changes, and is observed as heat generated in the core material. The eddy current loss element of the core loss is the result of induced voltages developed in the material as a result of an induced alternating flux, and is also observed as heat generated in the core material. As the flux density is raised in the operation of the electric motor to the point of saturation or oversaturation, the core loss is increased, thereby reducing the efficiency of the electric motor.

Such losses and efficiencies of electric motors play an important role in the implementation of electric motors in equipment technology improvements as alternatives that, for example, reduce reliance on foreign petroleum-based products. For example, vehicles that are fully or partially powered by such electric motors offer a solution and alternative that reduces reliance on foreign petroleum-based products.

A major hurdle in designing and implementing large electrically-powered vehicles involves the efficiency of the electric motors used therein. For example, 3-phase alternating current induction motors are sturdy and reliable, but can suffer core loss as described above. Further, such core loss increases the operating costs associated with the implementation of such electrically-powered vehicles.

Accordingly, there is a need for a system and method to improve the efficiency of electric motors to minimize an obstacle to the design and use of large electrically-powered vehicles.

SUMMARY OF THE INVENTION

Accordingly, exemplary embodiments of the present invention address the above and other issues, and provide improved efficiencies of electric motors to minimize an obstacle to the design and use of large electrically-powered vehicles.

Another aspect of exemplary embodiments of the present invention is to construct one or more of a stator and rotor of an electric motor wherein a core loss value is minimized. For example, an aspect of exemplary embodiments of the present invention is to provide a plurality of laminates in the construction of a stator and/or rotor wherein a core loss value of an assembled stator and rotor is minimized.

Another aspect of exemplary embodiments of the present invention is to provide a rotor comprising a plurality of rotor laminates stacked together, wherein the rotor is rigidly joined to a shaft. In at least one example, the rotor comprises M19 C5 core plate steel laminates, wherein the plurality of rotor laminates of the rotor are rotated approximately 180 degrees relative to adjacent rotor laminates and are temperature treated, preferably prior to assembly, such that a core loss value of an assembled rotor is minimized.

Another aspect of exemplary embodiments of the present invention is to provide a stator comprising a plurality of stator laminates stacked together, wherein the stator is joined to a housing with an interference fit. In at least one example, the stator comprises M19 C5 core plate steel laminates, wherein the plurality of stator laminates of the stator are rotated approximately 180 degrees relative to adjacent stator laminates and are temperature treated, preferably prior to assembly, such that a core loss value of an assembled rotor is minimized.

To substantially achieve these and other aspects of the present invention, a system and method is provided to manufacture laminations for the stators and rotors using for example, a water jetting operation, punching or stamping operation, laser cutting operation, or similar manufacturing operation, and subject the laminations to a temperature treatment after stamping, but preferably prior to assembly, in a manner that upon assembly into a rotor and/or stator of an electric motor and operated within expected parameters, core loss is reduced. The exemplary laminations are placed into a cold bath preferably consisting of liquid nitrogen prior to assembly such that a core loss value of an assembled rotor and/or stator is minimized.

BRIEF DESCRIPTIONS OF THE DRAWINGS

These and other objects, advantages and novel features of the invention will become more readily appreciated from the following detailed description when read in conjunction with the accompanying drawings, in which:

FIG. 3 is a chart showing core loss values before and after treatment in accordance with an exemplary embodiment of the present invention.

Throughout the drawings, like reference numerals will be understood to refer to like parts, components and structures.

DETAILED DESCRIPTION OF EXEMPLARY EMBODIMENTS

Figure 1:
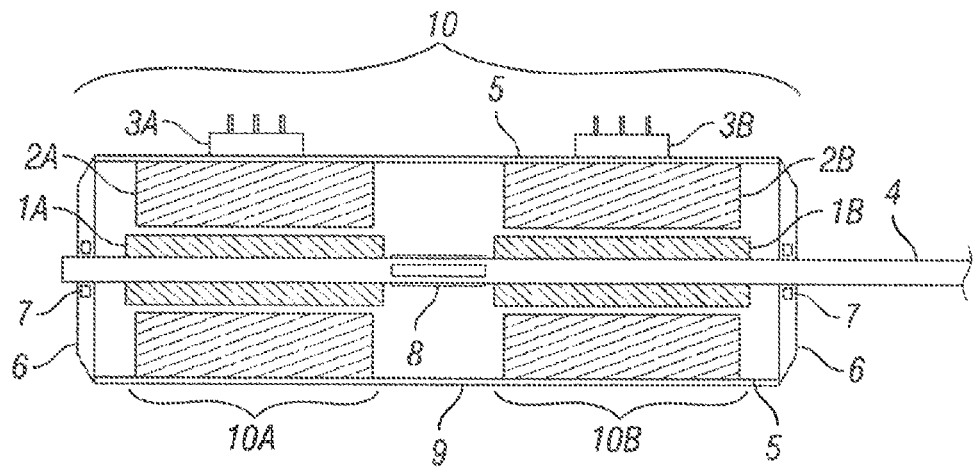
FIG. 1 is a sectional view of an electric motor in accordance with an exemplary embodiment of the present invention.

As shown in the attached figures, exemplary embodiments of the present invention provide one or more electric motors including rotors and stators, wherein the rotors are rigidly joined to a shaft thereby allowing communication of an output power from the motor, and the stator is affixed to the case. The rotor and stator are surrounded by a housing case and end bells having a configuration of bearings required by the application to provide rotational support to the shaft. To do so, the exemplary embodiments provide a system and method to manufacture laminations for the stators and rotors of a motor using one or more of a water jetting operation, punching or stamping operation using forged steel dies, laser cutting operation, or similar manufacturing operation, and then subject the laminations to a temperature treatment after manufacture, but preferably prior to assembly, in a manner that upon assembly into a rotor and/or stator of an electric motor and operated within expected parameters, core loss is reduced. Once constructed, the electric motor can be used in a system to produce higher output power at lower voltage levels than previous designs, with less core loss due to the stator and rotor material and construction.

In at least one example, the induction AC electric motor, which is powered only by batteries in an electric vehicle configuration, or powered by batteries and at times supplemented with power from an onboard combustion engine generator unit in a hybrid power source vehicle configuration, can be used as the tractive power source for a vehicle. In an exemplary operation, a variable frequency motor drive controller provides a variable frequency alternating current to the exciter windings in the stator, setting up a rotating electromagnetic field about the exciter winding in the stator. This rotating magnetic field induces a current flow within a conductive element in the inductive rotor, which creates a magnetic field about that conductive element. The interaction of the rotating and induced magnetic fields results in the rotation of the rotor around the axis of the common shaft. It is this behavior in response to the rotating electromagnetic field that makes the rotor an inductive rotor. Varying the frequency of the alternating current supplied by the motor drive controller controls the speed of the motor by controlling the speed of rotation of the rotating magnetic field. In doing so, the electric and hybrid electric vehicle designs are capable of more efficiently propelling a large vehicle with applications to, among other things, public transportation.

A primary energy supply can be comprised of a bank of batteries that are connected in series. In some examples, these batteries are clustered, with the batteries within a cluster connected in series, and with each cluster connected to the next in series. This provides the benefit of flexibility for even distribution of the batteries throughout the vehicle, balancing weight on both sides of the frame, and on both sides of a wheel axle. In some examples these batteries are either lead-acid batteries or lithium-ion batteries, wherein the end terminals of the battery series are connected to a common bus, which provides power to and receives power from a multitude of devices.

The batteries provide direct current (DC) power to a common bus and a DC/AC converter is used to provide the motors with the appropriate AC power. In some examples, this conversion is performed by a variable frequency motor drive controller. In some examples, the motor generates power during regenerative braking and applies the regenerative charging to the common DC bus for recharging the batteries. In some examples the motor drive controllers perform the AC/DC conversion for recharging.

In a hybrid power configuration embodiment, a combustion engine generator unit is included. Fuel from supply tanks is combusted to rotate a generator unit and produce AC power. An AC/DC rectifier applies the generator power to the common DC bus, where it can be used to power the traction motor and to recharge the batteries.

FIG. 1 shows a vertical cross section through the center of an example multiple induction motor 10, along the length of the common shaft 4, used in an electric or hybrid electric vehicle design. In at least one example, the induction motor comprises an AC induction motor joined by a rotor to a shaft and encased in a housing. The laminations of the stator and/or rotor are prepared in one or more of a water jetting operation, punching or stamping operation, laser cutting operation, or similar manufacturing technique, and are then subjected to a temperature treatment in a manner that upon assembly into a stator of the electric motor and operated within expected parameters, core loss is reduced.

The example of FIG. 1 includes two distinct AC induction motor units 10a and 10b, within the motor 10, but embodiments are not limited thereto. Motor unit 10a includes rotor 1a, stator 2a, and junction box 3a, while motor unit 10b includes rotor 1b, stator 2b, and junction box 3b. Each motor unit preferably operates independently, as there are no shared windings, controls, or common elements shared between the units, but embodiments are not limited thereto. However, both rotors 1a and 1b are rigidly joined to the common shaft 4, allowing a summation of output powers from the motor units when they are operating in synchronization.

All of the motor units of motor 10 are surrounded by a common housing case made up of a main body case 5 and end bells 6, but embodiments are not limited thereto. Both stators 2a and 2b are affixed to the main body case 5 so that no relative motion between the stators and the main body case can occur. End bells 6 complete the enclosure of the motor units, and have bearings 7 attached to provide rotational support to the common shaft 4.

In the example of FIG. 1, shaft ribbings 8 are attached to the common shaft 4 in areas of additional stress, such as the section of shaft between where the rotors 1a and 1b are joined to the shaft. A cooling jacket 9 is included in the main body case 5 to support thermal regulation of the motor.

In one example, the laminations for the stators and rotors of each motor unit are stamped using forged steel dies to reduce burrs in the laminations. Reducing the burrs in the laminations reduces the irregularities in the thickness of the stacked laminations, and increases the magnetic permeability of the stacked laminations because burrs can prevent the laminations from stacking tightly and uniformly against each other. In another example, the laminations for the stators and rotors of each motor unit are cut using a water jetting operation. Tests show water jetting manufacturing operations do not disturb material characteristics of the stators and rotors, such as molecular structures and arrangements, to the extent of other manufacturing operations.

The inherent variation in thickness of the rotor and stator laminations is accounted for by stacking the laminations with the thick edge of the each lamination aligned with the thin edge of the lamination below it. The laminations are produced from rolled sheet steel that has an inherent variation in thickness of approximately 10% between one edge of the roll and the other. This variation in thickness is dealt with by stacking the laminations with the thick edge of the each lamination aligned with the thin edge of the lamination below it. In this example, the described methods produce a finished piece (rotor or stator) with a stacking factor of at least 98%. This means that at least 98% of the total height of the stacked laminations in the piece is within the theoretical stack height based on the thickness of each lamination multiplied by the number of laminations.

Figure 2:
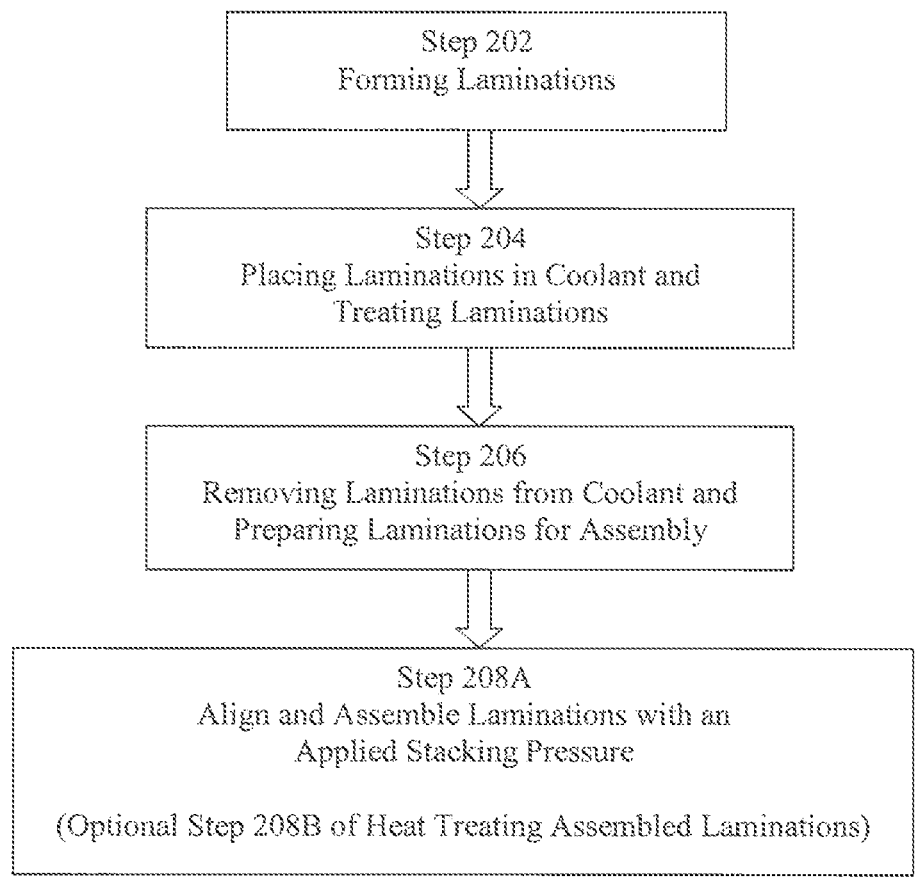
FIG. 2 is a flowchart of a method of constructing the electric motor of FIG. 1 in accordance with an exemplary embodiment of the present invention.

Further, the laminations of at least the stator are subjected to a temperature treatment after manufacture, but preferably prior to assembly, in a manner that upon assembly into a stator of an electric motor and operated within expected parameters, core loss is reduced. FIG. 2 is a flowchart of an exemplary method of constructing the electric motor(s) of FIG. 1 in accordance with an exemplary embodiment of the present invention. After manufacturing the laminations in step S202, the laminations are placed into a cold bath or coolant preferably consisting of liquid nitrogen in step S204 for a period of preferably 8 hours, but embodiments are not limited thereto. The laminations are placed into an insulated box containing liquid nitrogen, and liquid nitrogen is introduced at a rate of preferably 7 gallons per hour. In a preferred embodiment, the temperature of the liquid nitrogen is between 63 K and 77.2 K (−346 F and −320 F) at normal atmospheric pressure. The laminations are preferably at a room temperature of between 293 K and 298 K (68 F and 77 F) before being placed into the bath.

In step S204, the laminations remain submersed in the bath of liquid nitrogen for a period of preferably 8 hours and are then removed in a reverse process until completely free of the bath in step S206. The laminations are held free of the bath and allowed to reach room temperature before moving to assembly at step S208.

At assembly of step 208A, the laminations are arranged with the thick edge of each lamination aligned with the thin edge of the lamination below it, and a stacking pressure of preferably about 250 pounds per square inch is applied to the laminates, but embodiments are not limited thereto. The stator and/or rotor is then completed by the application of a wire winding having a varnish vacuum pressure impregnation. In one example, the coils of the stator are wound with flat wire at 875 circular mils per amp. The varnish vacuum pressure impregnation comprises the application of a vacuum, and then the exposure of the wire to pressure of about 95 pounds per square inch for about 2.5 hours. This procedure reduces voids in the insulation of the wire resulting in more uniform construction and electrical response of the stator. A tooth density of an exemplary stator is preferably 100.46 lines per square inch, and the air gap density is preferably 51.33 lines per square inch. The back iron density is 100.02 lines per square inch. These densities are with the motor operated at 320 volts and 60 hertz.

In another embodiment, the steps of FIG. 2 can be arranged such that an assembled and wound stator and/or rotor can be treated with liquid nitrogen. That is, step S208A can be performed first, wherein untreated laminations, not yet subjected to the treatments of steps 204 and 206, can be arranged and stacked, and completed by the application of wire windings. The assembled and wound stator and/or rotor can then be treated as in steps S204 and S206 by placing the assembled and wound stator and/or rotor into a cold bath or coolant preferably consisting of liquid nitrogen for a period of preferably 8 hours.

In one example of the invention, the laminations are made from steel stock that is eight feet long by 49 inches wide having a thickness of 0.014 inch on one edge and 0.0154 inch on another, but embodiments are not limited thereto. Other manufacturing processes will occur to those of skill upon review of this document that do not depart from the invention; for example automated manufacturing to the tolerances described in this document or even closer tolerances may be used. In some examples, the laminates are made from M19 C5 core plate steel tested using ASTM Designation A34, 25 cm Epstein Method, at 15 Kilogausses and 60 Hertz, but embodiments are not limited thereto. Using the method of FIG. 2, each laminate after treatment shows zero core loss when each laminate is subjected to a core loss test at 85,000 lines per square inch to ensure homogeneity of the magnetic flux across the lamination. After the assembly step S208A of FIG. 2, the stator comprised of the laminates shows a core loss of (163 W/lb. when each stator is subjected to a core loss test at 85,000 lines per square inch, shows a core loss of 0.78 W/lb. when each stator is subjected to a core loss test at 95,000 lines per square inch, and shows a core loss of 3.53 W/lb. when each stator is subjected to a core loss test at 230,000 lines per square inch. The illustrated core loss reflects a significant reduction in core loss values when compared with a stator wherein the laminations have not been subjected to the cooling steps S204 and S206 prior to assembly.

FIG. 3 is a chart showing core loss values before and after treatment in accordance with an exemplary embodiment of the present invention. In FIG. 3, values of a first test stator core and a second test stator core are shown, before and after the cooling steps S204 and S206. When applied with the test amp value, watt value and flux value of column 1, the first test stator shows a core loss of 2.747 W/lb. before treatment and shows a core loss of 1.481 W/lb. after treatment at $5,000 lines per square inch. The second test stator shows a core loss of 2.781 W/lb, before treatment and shows a core loss of 1.56 W/lb. after treatment at 85,000 lines per square inch. Similar improvements are shown at 90,000 lines per square inch, 95,000 lines per square inch, 100,000 lines per square inch, and 125,000 lines per square inch.

As noted above, core loss is defined as the amount of energy expended per unit mass of core material at a specific operating induction and frequency value. The hysteresis loss element of the core loss is the result of material resistance to domain arrangement changes, and is observed as heat generated in the core material. The eddy current loss element of the core loss is the result of induced voltages developed in the material as a result of an induced alternating flux, and is also observed as heat generated in the core material. As the flux density is raised in the operation of the electric motor to the point of saturation or oversaturation, the core loss is increased, thereby reducing the efficiency of the electric motor.

Further, the manufacturing techniques associated with preparing the laminates can be a factor in core loss magnitude. As noted above, laminations of the stator and/or rotor are prepared in one or more of a water jetting operation, punching or stamping operation, laser cutting operation, or similar manufacturing operation. In such operations, the lamination shapes and forms, and lamination material properties, can be subjected to forces and transformed in a manner that results in greater core losses in the final assembled stators and rotors, but which can benefit from the temperature treatment embodiments of the present invention. Even in the case of water jetting manufacturing operations which do not disturb material characteristics, such as molecular structures and arrangements, to the extent of other manufacturing operations, final assembled stators and rotors still benefit from the temperature treatment embodiments of the present invention. That is, in exemplary embodiments of the present invention, the adverse effects of either water jetting, punching, stamping or laser cutting of the laminations is reduced or reversed through the system and method of cooling the laminations before stacking. Such cooling can contribute to reduced hysteresis loss by arranging or aligning lamination material properties such that there is less resistance to domain arrangement changes upon operation. Such cooling can also contribute to reduced eddy current loss by arranging or aligning lamination material properties such that there is less eddy current upon operation.

The production and induction of magnetic fields and the application of rotational force to a shaft can be performed by a number of structures. In one example, the multiple induction motor is provided in a large electrically-powered vehicle and controlled by a variable frequency motor drive controller. In this example, the magnetic flux density in the back iron increases from 0-60 Hertz, and then begins decreasing for frequencies over 60 Hertz. This means that, when operating at over 60 Hertz, the back iron acts as a heat sink, helping to cool the motor. Storing electrical energy can be accomplished by batteries, fuel cells, and flywheels. Transmitting rotational forces to a drive wheel can be performed by, for example: a conventional transmission, including automatic, manual, and continuously variable transmissions; transaxles; differentials; shafts; geared hubs; and combinations of these structures.

Accordingly, by providing an electric motor in which efficiency is increased by subjecting the laminations to a temperature treatment in a manner such that, upon assembly into a stator and/or rotor of an electric motor and operated within expected parameters, core loss is reduced, the present invention eliminates an obstacle to the design and use of large electrically-powered vehicles. Such a reduction in core loss can reduce up to 90% of the heat associated with the core loss, thereby resulting in a longer life for the electric motor, and a lower operational cost per hour. Additional benefits of the present invention include a reduction in vibrations of the coil support finger plate of the stator, thereby further extending the life of the electric motor through vibration reduction. Further, by advancing the development of the design and use of large electrically-powered vehicles, associated industries can grow and expand thereby creating jobs and markets for products.

The foregoing disclosure is presented for purposes of illustration and description, and is not intended to limit the invention to the forms disclosed herein. Consequently, variations and modifications commensurate with the above disclosures and the disclosure of the relevant art are within the spirit of the invention. Such variations will readily suggest themselves to those skilled in the relevant art. Further, the examples described are also intended to explain the best mode for carrying out the invention, and to enable others skilled in the art to utilize the invention and such or other embodiments and with various modifications required by the particular applications or uses of the invention. It is intended that the appended claims be construed to include alternative embodiments to the extent that is permitted by prior art.

What is claimed is:

1. A method to reduce core loss in an electric motor by preparing laminates of at least one of the stator and rotor such that, upon assembly into a stator and rotor of an electric motor and operated within expected parameters, core loss is reduced, comprising:
    forming at least one of a stator and a rotor laminate;
    subjecting the at least one stator and rotor laminate to a reduced temperature bath; and
    assembling a plurality of the stator and rotor laminates into a stator and rotor of an electric motor, respectively, such that upon operation, the electric motor exhibits reduced core loss,
    wherein the at least one stator and rotor laminate is subjected to the reduced temperature by submersion of the laminate into a cold bath,
    wherein the at least one stator and rotor laminate remains submersed in the cold bath for a period of up to 8 hours and is then removed in a reverse process until completely free of the cold bath, and
    wherein the at least one stator and rotor laminate is held free of the cold bath and allowed to substantially reach room temperature before assembly.

2. The method of claim 1, wherein the at least one stator and rotor laminate is formed using one or more of a water jetting operation, punching operation, stamping operation and laser cutting operation.

3. The method of claim 1,
    wherein the cold bath is comprised of a liquid nitrogen bath comprising an insulated chamber containing liquid nitrogen, and
    wherein the liquid nitrogen is introduced to the cold bath at a rate of up to 7 gallons per hour.

4. The method of claim 1, wherein the temperature of the cold bath is maintained between 63 K and 77.2 K (−346 F and −320 F) at normal atmospheric pressure.

5. The method of claim 1, wherein the at least one stator and rotor laminate is at a room temperature of between 293 K and 298 K (68 F and 77 F) before being placed into the cold bath.

6. The method of claim 1,
    wherein the stator comprises a plurality of stator laminates stacked together and the rotor comprises a plurality of rotor laminates stacked together,
    wherein at assembly, the plurality of laminates are arranged with a thick edge of each laminate aligned with a thin edge of a laminate below it, and
    wherein a stacking pressure of about 250 pounds per square inch is applied to the arranged laminates.

7. The method of claim 1,
    wherein at assembly, the stator and rotor is shortened by one laminate at each end of the stator and the rotor, and
    wherein the stator and the rotor each has a stacking factor of at least 98 percent.

8. The method of claim 1, wherein at assembly, a wire winding having a varnish vacuum pressure impregnation is applied to the stator and rotor.

9. The method of claim 1, wherein the assembly of at least one of the stator and rotor is performed before subjecting the laminates to the reduced temperature bath.

10. A method to reduce core loss in laminates of an electric motor, comprising:
    forming at least one of a stator or a rotor laminate;
    subjecting the laminate at a room temperature of between 293 K and 298 K (68 F and 77 F), to a reduced temperature bath maintained between 63 K and 77.2 K (−346 F and −320 F) at normal atmospheric pressure; and assembling a plurality of laminates into an electric motor such that upon operation, the electric motor exhibits reduced core loss.

11. The method of claim 10,
wherein the reduced temperature bath is comprised of a liquid nitrogen bath, and
wherein the liquid nitrogen bath comprises an insulated box containing liquid nitrogen and the liquid nitrogen is introduced to the bath at a rate of up to 7 gallons per hour.

12. The method of claim 10, wherein the laminate is placed into the reduced temperature bath for a period of up to 8 hours.

13. The method of claim 10, wherein the assembly of laminates is performed before subjecting the laminates to the reduced temperature bath.

14. A method to reduce core loss in laminates of an electric motor, comprising:
subjecting at least one of a stator or a rotor laminate at a room temperature of between 293 K and 298 K (68 F and 77 F), to a reduced temperature bath maintained between 63 K and 77.2 K (−346 F and −320 F) at normal atmospheric pressure; and assembling a plurality of laminates at a room temperature of between 293 K and 298 K (68 F and 77 F) into an electric motor such that upon operation, the electric motor exhibits reduced core loss.

15. The method of claim 14,
wherein the reduced temperature bath is comprised of a liquid nitrogen bath, and
wherein the liquid nitrogen bath comprises an insulated box containing liquid nitrogen and the liquid nitrogen is introduced to the bath at a rate of up to 7 gallons per hour.

16. The method of claim 14, wherein the laminate is placed into the reduced temperature bath for a period of up to 8 hours.

17. The method of claim 14, wherein the assembly of laminates is performed before subjecting the laminates to the reduced temperature bath.

* * * * *